United States Patent [19]

Blinder

[11] 3,865,454

[45] Feb. 11, 1975

[54] ADAPTER FOR HIGH DENSITY CONNECTORS

[75] Inventor: Marvin Blinder, Union, N.J.

[73] Assignee: Loral Corp., New York, N.Y.

[22] Filed: July 18, 1973

[21] Appl. No.: 380,506

[52] U.S. Cl. .................. 339/17 C
[51] Int. Cl. .................. H05k 1/04
[58] Field of Search ........... 339/17, 18, 19, 75, 174, 339/99, 176, 192–194, 89, 49, 119, 125

[56] References Cited

UNITED STATES PATENTS

| | | | |
|---|---|---|---|
| 2,876,391 | 3/1959 | Sanders, Jr. | 339/17 N |
| 3,551,874 | 12/1970 | Volinskie | 339/17 R |
| 3,644,792 | 2/1972 | Fields | 339/17 C |

FOREIGN PATENTS OR APPLICATIONS

| | | | |
|---|---|---|---|
| 1,086,414 | 10/1967 | Great Britain | 339/17 C |

*Primary Examiner*—James T. McCall
*Assistant Examiner*—Terrell P. Lewis
*Attorney, Agent, or Firm*—Charles E. Temko

[57] ABSTRACT

An adapter for use in conjunction with known high density electrical connectors permitting the use of programmed mechanical devices for attaching leads to the connector. The device comprises a small printed circuit board having a centrally disposed area mounting a plurality of closely grouped pin contacts positioned to engage corresponding pin sockets in the mating connector, and a plurality of generally peripherally arranged contact lugs interconnected to corresponding pin contacts through the conductors on said printed circuit board.

3 Claims, 5 Drawing Figures

ADAPTER FOR HIGH DENSITY CONNECTORS

BACKGROUND OF THE INVENTION

This invention relates generally to the field of electrical hardware, and more particularly to devices for interconnecting various electronic modules for mutual communication. Complex circuitry of such modules requires the interconnection of large numbers of subcircuits, such interconnection being commonly accomplished by so-called high density connectors of known type, in which as many as 85 circuits are simultaneously connected. One element of the connector includes a plurality of sockets arranged in a cluster covering an area surrounded by an arcuate border. The sockets are engaged by corresponding pin contacts in turn connected to conductors leading to the modular equipment being connected. Because of the spacing between adjacent sockets, it has heretofore not been possible to use programmed automated equipment for connecting conductors to the pin contacts which engage the sockets, and this interconnection has therefore been accomplished as a hand operation, prior to seating the pin contacts into the corresponding sockets. Aside from the physical effort involved, the individual operations tax the mental capacity of the worker, who must keep track of the large number of leads, with a corresponding likelihood of error occurring at periodic intervals.

Where high density connectors are not required, it is known in the art to provide mechanized devices which attach the ends of wire leads to corresponding lugs using a spring clip at the end of the conductor, such devices using a predetermined program arranged to progressively interconnect the lugs which are arranged in a known coordinate system, such as rectangular coordinates. Such mechanical wiring operations require spacing between the adjacent connections which is far in excess of that present in high density connectors. Thus, in relatively complicated electronic structures, the bulk of the wiring can be accomplished mechanically, whereas high density connectors still must be wired by hand.

BRIEF DESCRIPTION OF THE PRESENT INVENTION

Briefly stated, the invention contemplates the provision of an adapter to be used in conjunction with known high density connectors to permit the use of existing programmed mechanical wiring devices of the above described type. The adapter comprises essentially a printed circuit board of relatively small overall size, a centrally disposed area of which mounts a closely grouped plurality of pin contacts adapted to mate with corresponding sockets in another element of a high density connector, and a peripheral area which mounts known wire connecting lugs arranged in a predetermined coordinate system, and communicating with corresponding pin contacts through circuits printed on the board. The printed circuit board may be supported in jigging means for mechanically securing conductors to the lugs at the time of installation, and the pin contacts are inserted into the sockets of the high density connector by a simple plugging operation.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
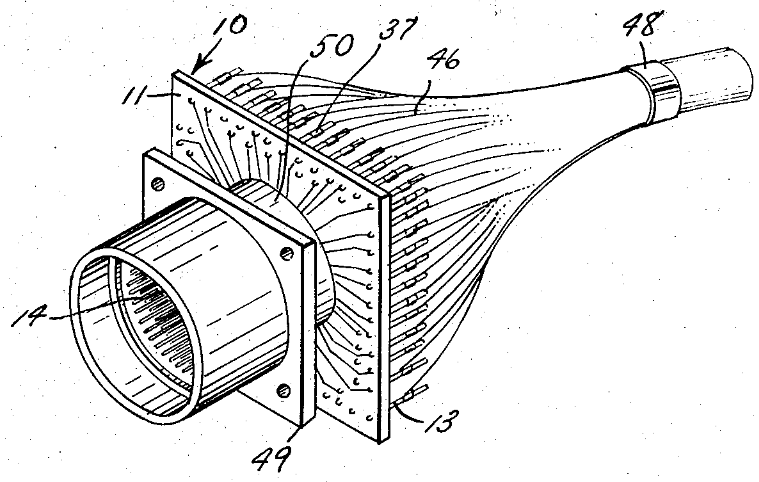
FIG. 1 is a fragmentary perspective view showing an embodiment of the invention in installed condition to interconnect a plurality of circuits through a high density connector.
Figure 2:
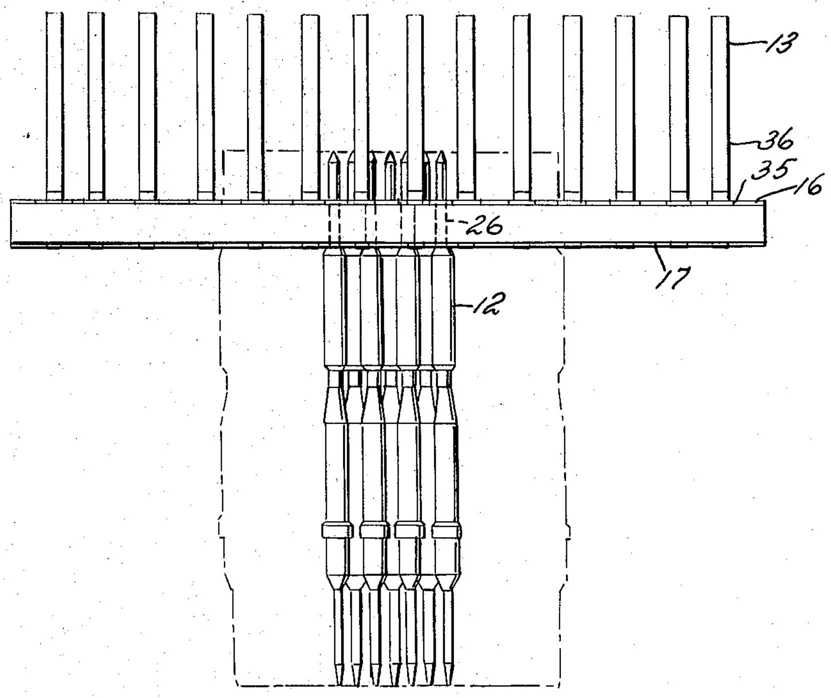
FIG. 2 is a side elevational view of the embodiment in detached condition.

In accordance with the invention, the device, generally indicated by reference character 10, comprises broadly: a printed circuit board element 11, a plurality of pin contacts 12, and a plurality of lug connectors 13.

Figure 3:
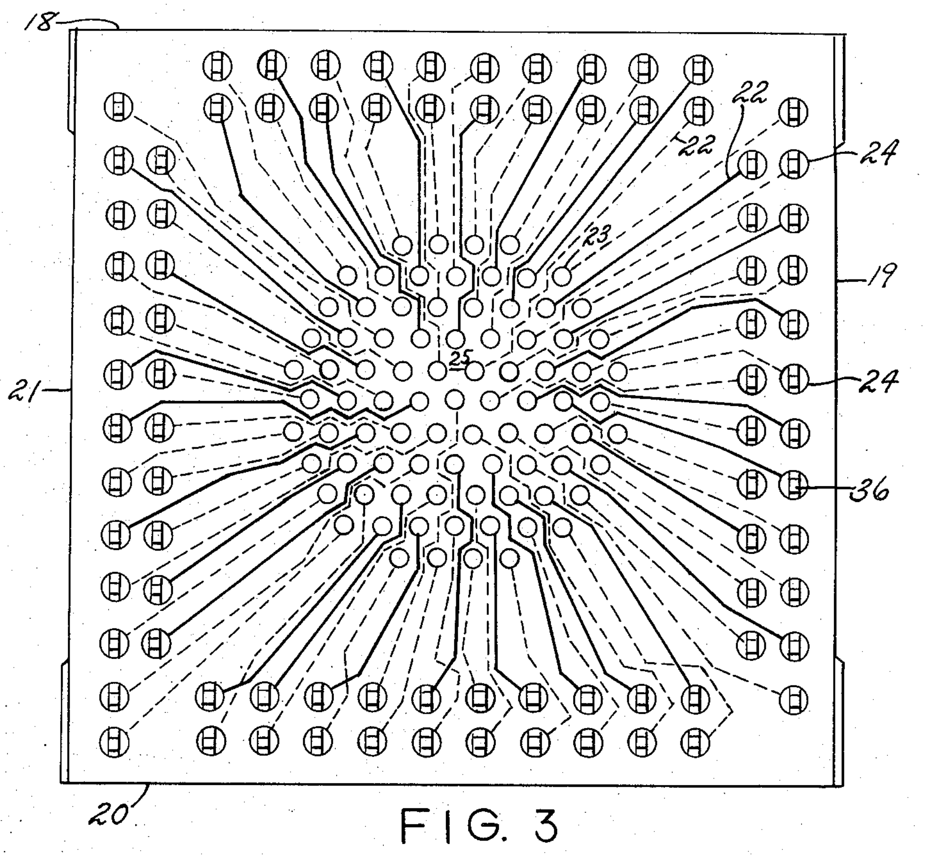
FIG. 3 is a top plan view of the embodiment.

The board element 11 is preferably formed of planar synthetic resinous material commonly used for such purposes, such as polyethylene, phenolic resins, and the like. It is bounded by a first or upper surface 16, a second or lower surface 17, as well as side edges 18, 19, 20 and 21. Disposed on both of the surfaces 16 and 17 are printed conductors 22 formed in a manner well known in the art, each conductor including an inner terminal point 23 and a peripheral terminal point 24. As best seen in FIG. 3, the points 23 are clustered within a generally circular area 25 corresponding to the standardized area of the high density connector 14 with which it is used. Each of the points 23 includes an opening 26 accommodating a pin contact 12 anchored in place by dip soldering or other suitable conductive means.

Figure 5:
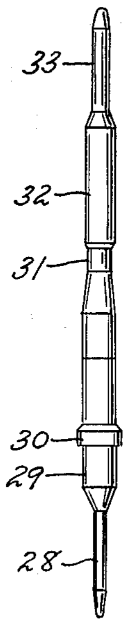
FIG. 5 is a side elevational view of a modified standard pin connector forming a part of the embodiment.

The pin contacts 12 are of modified standardized type, and as best seen in FIG. 5, each includes an inner end 28 of pointed configuration, a portion of greater diameter 29, a shoulder portion 30, a portion of reduced diameter 31, a second portion 32 of greater diameter, and a pointed outer end 33. The above described configuration is dictated by the configuration of the sockets in the high density connector, and may be varied as required.

The lug connectors 13 are also of standardized configuration, including a base portion 35 which penetrates a corresponding opening in the board element 11, and an outwardly extending projection 36 adapted to engage a resilient clip terminal 37 which is slidably engaged thereon. Each peripheral point 24 includes a corresponding opening surrounding the base portion 35 to complete electrical contact therethrough.

Figure 4:
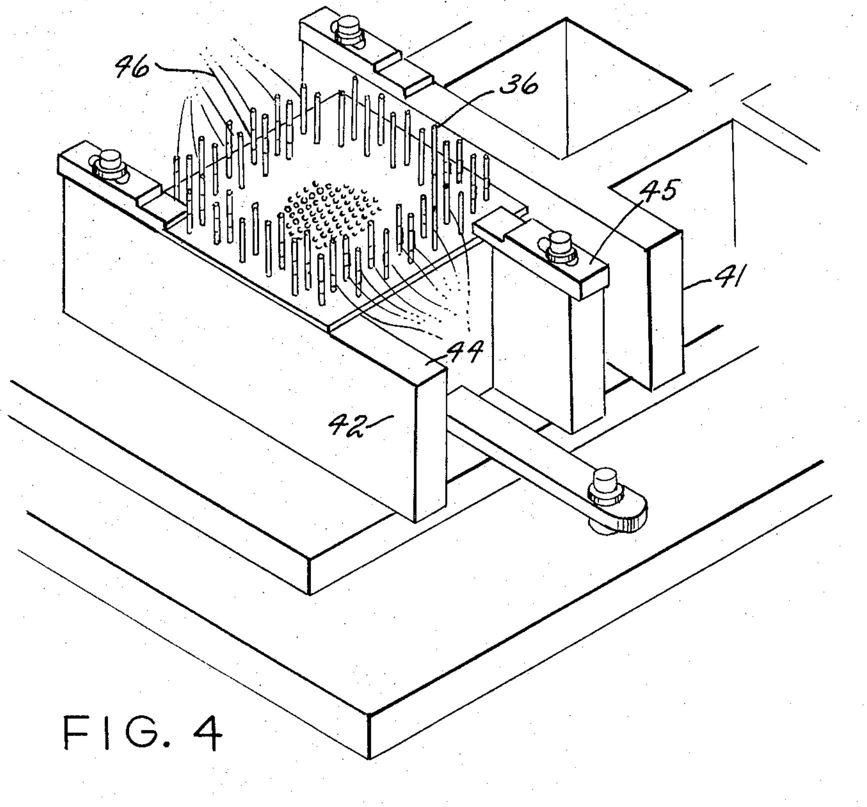
FIG. 4 is a fragmentary perspective view showing the embodiment supported in a jig for the purpose of mechanical interconnection of wire leads thereto.

FIG. 4 illustrates a jig structure 41 which supports the device 10 in fixed position so that it may be mechanically wired. The jig may be of any required configuration, normally including a plurality of walls 42 defining an opening therebetween and supporting surfaces 44 upon which a surface of the element 11 may rest. Clamping devices 45 engage an oppositely disposed surface to assure complete immobility. Electrical leads 46 are interconnected to the projections 36 by the above mentioned resilient clips 37, using the mechanical wire interconnector (not shown). At the completion of the wiring operation, where required, a conventional harness 48 (FIG. 1) may be used to surround all of the leads 46 to constrain them to a workable configuration.

As is known in the art, conventional high density connectors, such as that indicated by reference character 14 (FIG. 1) include a bracket 49 permitting the same to be secured to the wall of a housing enclosing an electronic apparatus, whereby the device is maintained in a position suitable for interconnection with an externally disposed plug (not shown). Once the pin connectors 12 have been inserted into the inner or concealed end of the connector 14, a locking ring 50 may be rotated to lock the pin connectors in engagement, as would be the case if each of the individual leads 46 had been separately attached to the pin connector and manually inserted.

Thus, the function of the device 10 is to enlarge the area normally encompassed by the high density connector to a degree where automated devices may be used to interconnect leads thereto. The device 10 may be made in standardized configuration, depending upon the particular high density connector with which it is to be used, and in some applications, not all of the pin contacts 12 and lugs 13 will be utilized. However, because of the standardized configurations of the lug connectors 13, it is possible to program existing wiring devices to accomplish the wiring operation in a convenient manner. It will be understood by those skilled in the art to which the invention pertains, that the invention is not limited to those configurations in which the lug connectors 13 are arranged in rectangular coordinates, it being possible, where required, to arrange the lugs in terms of polar coordinates or other predetermined patterns, so long as the wiring device may be correspondingly programmed.

I wish it to be understood that I do not consider the invenetion limited to the precise details of structure shown and set forth in this specification, for obvious modifications will occur to those skilled in the art to which the invention pertains.

I claim:

1. Means for interconnecting high density circuitry comprising in combination: a high density connector including a housing having pin contact retention means defining a plurality of closely spaced socket openings disposed in mutually parallel relation within said housing, and an adapter comprising a printed circuit board element having first and second planar surfaces, and having a generally centrally disposed area of size and configuration corresponding to said pattern of closely spaced openings in said connector, said area having a corresponding plurality of openings therethrough, a plurality of elongated pin contacts, each having one end thereof fixed within one of said plurality of openings, and extending outwardly substantially perpendicular to one of said planar surfaces; said circuit board element having a second generally peripherally disposed area having a second corresponding plurality of openings, and a plurality of lug connectors, each having one end fixed within said second plurality of openings; and a plurality of printed circuits, each interconnecting one pin contact with a corresponding lug connector to establish electrical communication therewith, said pin contacts being engaged within said high density connector, and a plurality of conductors attached to said lug connectors.

2. Structure in accordance with claim 1, in which said second plurality of openings are arranged in accordance with a rectangular coordinate system.

3. Structure in accordance with claim 1, in which substantially one half of said printed circuits are disposed on each of said first and second surfaces of said printed circuit board element.

* * * * *